May 24, 1927.
R. D. CAFFARELLO
1,629,949
POWER TAKE-OFF FOR ENGINE CRANK SHAFTS
Filed Aug. 13, 1925
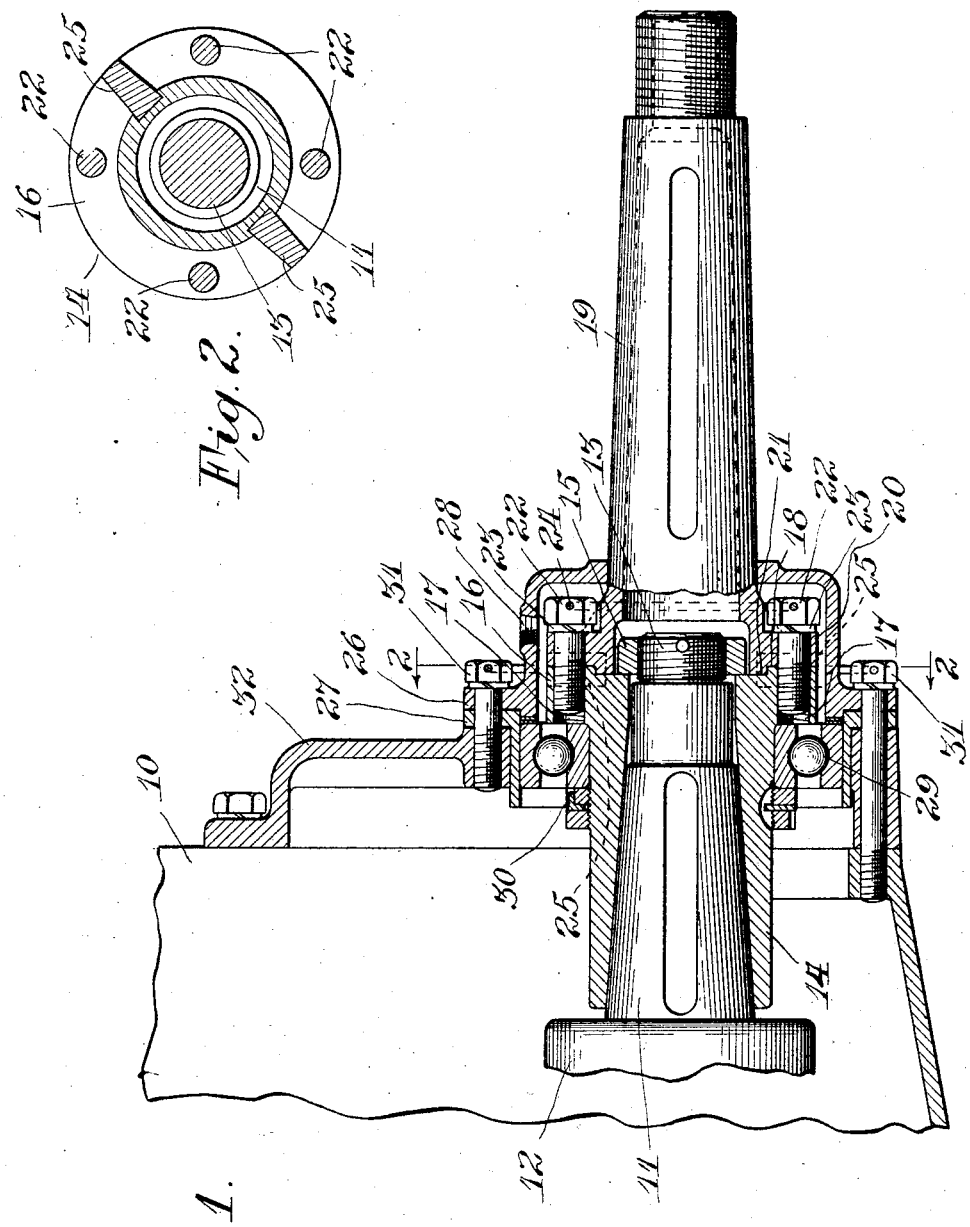
Inventor:
Ralph D. Caffarello,
By Paul O. Pippel
Atty Patented May 24, 1927.

1,629,949

UNITED STATES PATENT OFFICE.

RALPH D. CAFFARELLO, OF CHICAGO, ILLINOIS.

POWER TAKE-OFF FOR ENGINE CRANK SHAFTS.

Application filed August 13, 1925. Serial No. 49,890.

My invention relates generally to power driven shafts and especially to a power take-off shaft which is coaxial with an engine crank shaft.

While the power take-off shaft herein to be described and illustrated very likely is capable of use in many connections, yet, the preferable embodiment will be disclosed in connection with an internal combustion motor of the type employed in propelling aeroplanes.

Heretofore, in certain types of aviation motors, the shaft which carries and drives the propeller is spaced in parallel from the engine crank shaft and is geared thereto, thus, necessitating the employment of gearing which both adds to the weight of the aeroplane and increases the expense thereof.

The main object of this invention is to simplify such driving connection with the engine by arranging the propeller carrying and driving shaft coaxial with the engine crank shaft, thereby eliminating the gearing heretofore used and in general reducing weight and expense.

Another object is to provide a sturdy coupling between the coaxial power take-off shaft and the engine crank shaft.

Other objects will be apparent to anyone skilled in this art as the description progresses.

These objects are achieved, briefly, in the provision of a sleeve keyed to the protruding end of the engine crank shaft, and securing the propeller, or power take-off shaft in a novel manner to said sleeve. A bearing and casing are also provided to reduce friction and exclude dirt.

In the accompanying sheet of drawings, wherein like characters of reference denote like parts,—

Fig. 1 is a central, vertical sectional view through the engine crank shaft and power take-off shaft and showing the coupling between the two; and Fig. 2 is a vertical, end sectional view taken along the line 2—2 of Fig. 1, looking in the direction of the arrows.

Referring to the drawings, there is shown in Fig. 1 an engine having a crank case 10, a crank shaft 11 protruding forwardly through the casing, and a bearing 12 for supporting the crank shaft in the usual way. The crank shaft end is tapered as shown and has its extreme free end reduced and tapped with screw threads, as shown at 13, for a purpose later to appear. A sleeve or collar 14 is suitably keyed to the shaft 11 and extends therealong to the reduced end 13, which is provided with a nut 15, securely to lock the sleeve 14 and prevent its endwise displacement on the crank shaft. The end of the sleeve 14 is provided with an outwardly disposed flange 16, said flange being provided with threaded apertures 17 equidistantly spaced therearound. The flange also has its end face provided with an annular shoulder 18. A power take-off or propeller carrying shaft 19, preferably tubular, is coaxially arranged with respect to the engine crank shaft and has a complementary, apertured flange 20 and an annular shoulder 21 which mate with the flange and shoulder on the sleeve 14. The apertures in the flanges of the sleeve 14 and shaft 19 are brought into register, and the sleeve and shaft are held together by the bolts 22. The bolts are prevented from accidental unloosening by spring lock washers 23 and a wire 24 passing through an aperture in each bolt head. As the crank shaft of the engine operates at about 1800 to 2000 R. P. M., it will be appreciated that great pulling strains must be taken up by the bolts 22 and thus, further to strengthen the coupling between the sleeve 14 and shaft 19, it has been deemed advisable to provide complementary key ways and keys 25 in diametrically opposed relationship in the flanges of said collar and shaft. The keys are preferably wedge-shaped so that the centrifugal forces set up by the rapid rotation will not throw them out.

A housing is provided for the coupling so that dirt may be excluded and lubricant may be retained. The front part 26 of this casing is shown bolted to the rear part 27, the front part 26 being provided with a screw threaded aperture 28 for the reception of any suitable lubricating device. It will be observed that a roller bearing 29 surrounds and carries the sleeve 14 and that the bearing is held in place against the front housing part 26 by means of a nut lock 30 threaded to the collar 14. There is thus provided an efficient friction reducing arrangement which permits easy running of the shaft, and which furthermore takes up the severe radial and end thrusts created by the pull of the propeller. The bolts which secure the parts of the housing together, indicated at 31, also secure a housing extension 32 in place, the extension furthermore being bolted to the engine crank case, as shown. Similarly with the bolts 22, the bolts 31 are also provided with lock washers and are wired together.

From the above detailed description, it will be noted that in operation the engine crank shaft 11, the sleeve 14 and the extension shaft 19 all turn together as a unit, and that the coupling between the sleeve and extension shaft is strong and will withstand the severe strains which the high speed of aeroplane motors and pull of the propeller bring about. Also, the parts are easily lubricated, and dirt proof, and, furthermore, disassembly of the power take-off shaft can be quickly accomplished with a minimum of effort.

While I have shown the preferred form of the invention, it is to be understood that various changes in form, construction and arrangement of parts may be resorted to by those skilled in this art without departing from the spirit and scope of the invention as hereinafter claimed.

What I claim as new is:

1. The combination with an engine having a crank shaft, of a sleeve fast on the crank shaft and having an annular end flange provided with an annular shoulder, a propeller carrying and driving shaft projected to surround the end of the crank shaft and having a complementary end flange and annular shoulder, radially disposed registering keyways in the flanges and crossing the shoulders, keys in the keyways, and bolts passing through the flanges, whereby the sleeve and propeller carrying shaft are securely locked together in a manner directly to connect the propeller carrying shaft and sleeve in coaxial relationship.

2. The combination with an engine having a crank shaft, of a sleeve fast on one end of the crank shaft and having an end flange, a propeller carrying and driving shaft having a complementary flange and rigidly bolted coaxially to said sleeve, said flanges being provided with radially tapering keyways, and tapered keys in said keyways.

3. The combination with an engine having a crank shaft, of a sleeve fast on one end of the crank shaft and having an annular end flange, a propeller carrying and driving shaft having a complementary annular end flange, said flanges having tapered, radially extending, diametrically opposed keyways formed therein, tapered keys in said keyways, and bolts securing the flanges together, whereby the sleeve and propeller carrying shaft are securely locked together in a manner directly to connect the propeller carrying shaft and sleeve in coaxial relationship.

4. The combination with an engine having a crank shaft, of a sleeve fast on the free end of said shaft, a nut threaded on said end of the crank shaft to prevent displacement of said sleeve, a tubular, coaxial shaft extending from said crank shaft end and secured to the sleeve by means of complementary bolted flanges on the sleeve and tubular shaft, a housing for said structure carried by the engine, an anti-friction bearing supporting said sleeve in the said housing, said bearing being located on the engine side of the flanges mentioned, and a lock nut for retaining said bearing against endwise movement along the sleeve.

Signed at Chicago, in the county of Cook, and States of Illinois, this 11th day of August, 1925.

RALPH D. CAFFARELLO.